T. ZETTERLUND.
SEMI-AUTOMATIC ROLLER RETAINER MILLING MACHINE.
APPLICATION FILED OCT. 3, 1918.

1,333,053.

Patented Mar. 9, 1920.
5 SHEETS—SHEET 1.

Fig. 1.

WITNESS:

T. P. Britt

INVENTOR
Theodor Zetterlund
BY 
ATTORNEY

T. ZETTERLUND.
SEMI-AUTOMATIC ROLLER RETAINER MILLING MACHINE.
APPLICATION FILED OCT. 3, 1918.

1,333,053.

Patented Mar. 9, 1920.
5 SHEETS—SHEET 4.

WITNESS:
T. P. Britt

INVENTOR
Theod. Zetterlund
BY Geo. Young
ATTORNEY

T. ZETTERLUND.
SEMI-AUTOMATIC ROLLER RETAINER MILLING MACHINE.
APPLICATION FILED OCT. 3, 1918.

1,333,053.

Patented Mar. 9, 1920.
5 SHEETS—SHEET 5.

WITNESS:
T. P. Britt

INVENTOR
Theodor Zetterlund
BY Geo. Young
ATTORNEY

UNITED STATES PATENT OFFICE.

THEODOR ZETTERLUND, OF MILWAUKEE, WISCONSIN, ASSIGNOR TO HARLEY-DAVIDSON MOTOR COMPANY, OF MILWAUKEE, WISCONSIN.

SEMI-AUTOMATIC ROLLER-RETAINER MILLING-MACHINE.

1,333,053.   Specification of Letters Patent.   Patented Mar. 9, 1920.

Application filed October 3, 1918. Serial No. 256,715.

*To all whom it may concern:*

Be it known that I, THEODOR ZETTERLUND, a citizen of the United States, and resident of Milwaukee, in the county of Milwaukee and State of Wisconsin, have invented certain new and useful Improvements in Semi-Automatic Roller-Retainer Milling-Machines; and I do hereby declare that the following is a full, clear, and exact description thereof.

My invention relates to new and useful improvements in cutting machines of that type wherein the work is automatically fed for the cutting operation and retracted subsequent to the cutting operation.

It is in general the object of my invention to simplify the structure, to improve the efficiency and to increase the rapidity of operation of machines of this character, as well as to increase the facility with which work articles may be placed in and removed from the machine, it being more particularly an object to embody the foregoing advantages in a machine including an annular gang of milling members adapted to drill out the roller receiving openings of a roller retaining ring of the type conventionally employed in roller bearings.

A further and important object resides in the provision, in a machine of the character described, of an arrangement including a plurality of chuck members selectively movable to cutting alinement to the milling tools whereby the insertion of a work member in one of the chucks may be carried out simultaneously with the milling operation on a work member secured in another chuck to thus procure a milling operation interrupted only for the periods of time necessary in presenting freshly filled chucks to the milling tools, more detailed objects in this connection residing in the provision of means for insuring proper relative position of the work member with respect to the milling tools at the outset of the milling operation, and for preventing the institution of such milling operation until this position has been assumed.

A still further object resides in the provision of means for readily adjusting the depth of the cut of the milling tools.

With the above and other objects and advantages in view, my invention resides in the novel construction, combination and arrangement of parts, which will be more particularly hereinafter described and pointed out in the appended claims.

Figure 1:
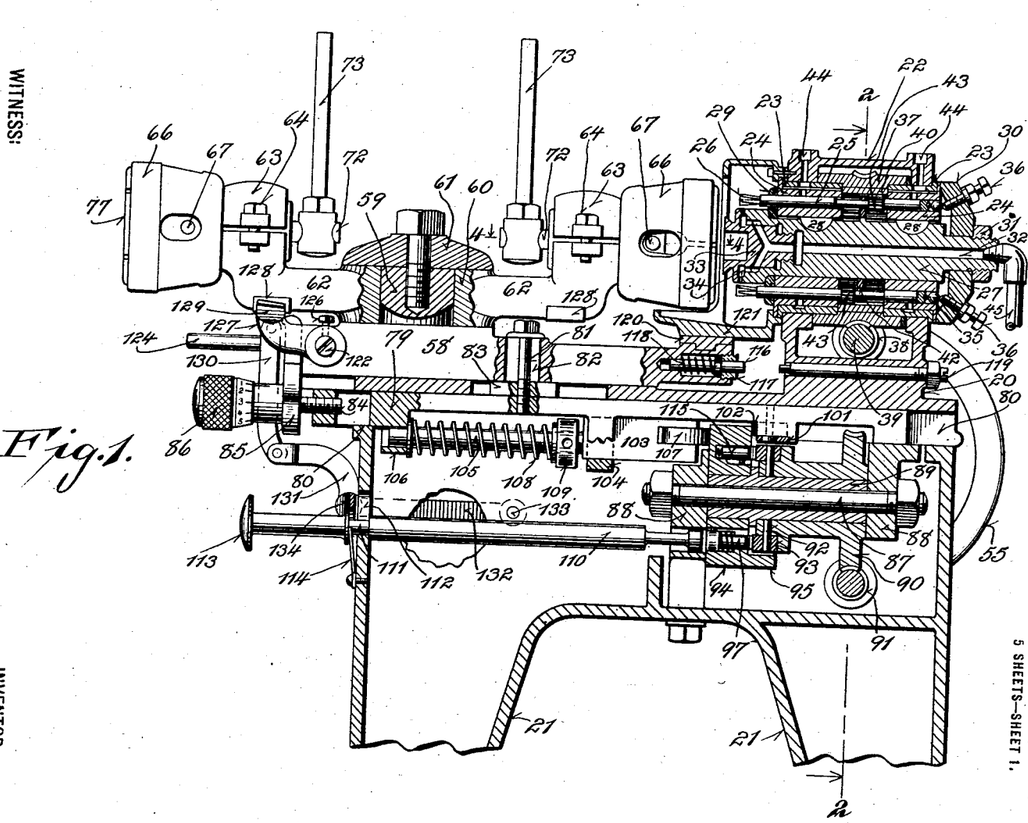
Figure 1 is a vertical longitudinal sectional view through an automatic multiple milling machine embodying my invention, the plane of this figure being indicated by the line 1—1 of Fig. 2.
Figure 2:
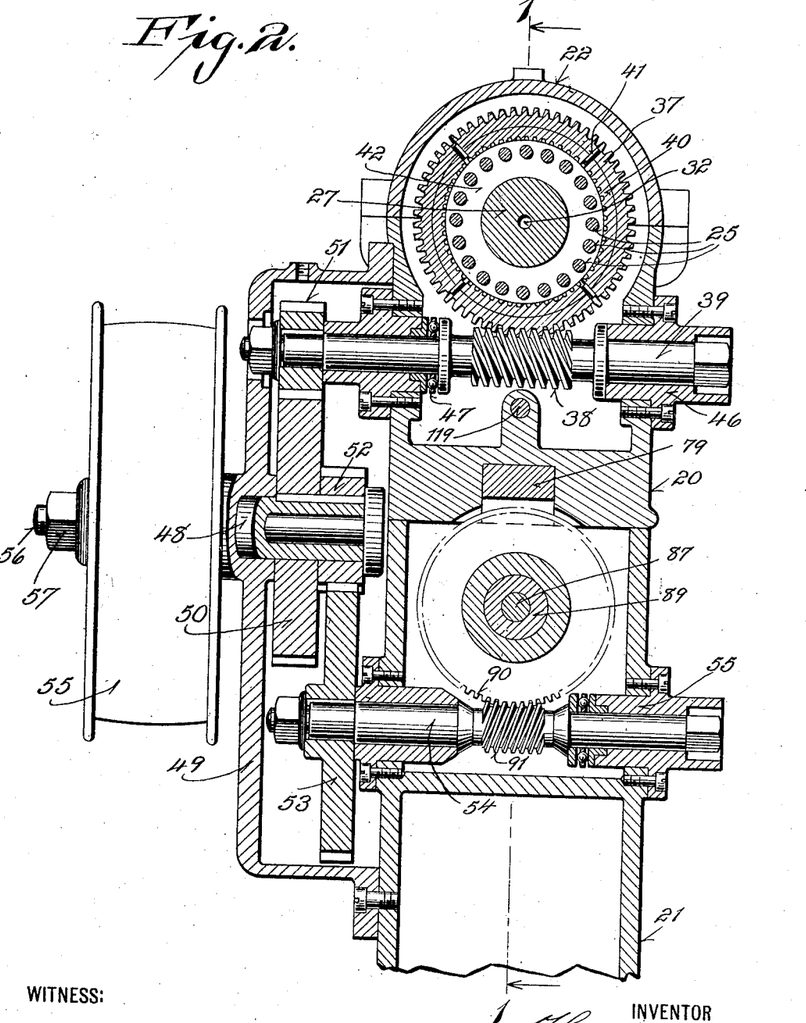
Fig. 2 is a transverse sectional view through the milling head end of the machine on the line 2—2 of Fig. 1.
Figure 6:
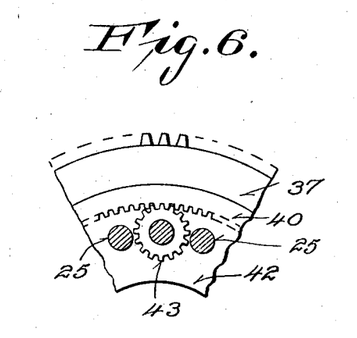
Fig. 6 is a detailed sectional view, enlarged, on the plane of Fig. 2, showing the drive for one of the milling shafts.

Referring now more particularly to the drawings, there is provided a table or base plate 20 having depending casing walls at its edges merging into hollow supporting legs 21 for the table. Upstanding at one end of the table is a cylindrical head stock casing 22 having its axis disposed horizontally and provided with openings in its ends in which are positioned bearing rings 23 projecting inwardly of the walls. Nested within these bearing rings are rings 24 having alining annular series of bores extending therethrough parallel to their axes. Journaled in each of these bores is a milling shaft 25, said shafts extending across the space between the rings 24, and having their inner ends projecting past the inner ring and carrying milling tools 26 in any suitable manner. Extended through the casing and within the rings 24 is a core cylinder 27, secured by keys 28 to the rings 24 and having its inner end enlarged in cup shape and forming an annular shoulder. Between this shoulder and the end faces of the adjacent ring 24 is an annular packing disk 29 channeled on its face adjacent the ring 24 and of such width as to project from the periphery of the core cylinder 27 and receive the milling shafts 25 therethrough. The core cylinder 27 is provided with a rearward extension projecting from the casing and mounted on this section is a cupped end plate 30 which is held in clamping relation to a flanged rear portion of the adjacent ring 24 by a nut 31 threaded on the cylinder extension, the forward end of the cylinder being thus drawn rearwardly to compress the disk 29 between the shoulder of the cylinder and the face of the adjacent ring 24. The cylinder is provided with a longitudinal passage-way 32 extending therethrough and which connects at its forward end with branch passages of a plug 33 threaded in the cupped forward end of the cylinder, the passages of this plug terminating in radial spray apertures 34 adapted to discharge oil against the milling tools in operation thereof. End thrust bearings for the drill shafts 25 are afforded by balls 35 disposed in the shaft bores of the rear ring 24 and engaged by adjusting screws 36 threaded obliquely through the peripheral portions of the cup end plate 30. Disposed within the casing and journaled on the inner portions of the bearing rings 23 is a drive annulus 37 having worm teeth on its outer periphery engaged with a worm 38 carried on a shaft 39 disposed transversely in the lower side of this casing. Gear teeth are mounted on the inner periphery of this drive annulus between the drive shaft bearing rings 24, these gear teeth being preferably cut in a second annulus member 40 fitted within the annulus 37 and extending between the rings 23 and secured to the annulus 37 by radial lock pins 41 passed through both members. An annular partition flange 42 is mounted on the core cylinder 27 between the rings 24, said flange also receiving the milling shafts therethrough, and mounted on alternate shafts at one side of this partition are gear pinions 43 in mesh with the gear teeth of the annulus member 37. The remaining shafts have similar gear pinions, also designated as 43, disposed on the opposite side of the partition, which thus serves to hold the pinions against mutual inter-locking relations, the pinions being by this arrangement disposed in staggered relation throughout the annular series of milling shafts whereby to permit a desired maximum closeness of the shafts. Oil is supplied to the milling shafts through convenient passages 44 extending from the top of the casing 22, and a continuous feed of oil is provided for the milling tools by a pipe 45 connecting with the rear end of the passage 32 of the core cylinder 27. The annular packing disk 29 prevents leakage of shaft lubricating oil between the core cylinder 27 and the inner journaled ring 24 and also through the shaft journals in said ring.

An exceedingly simple and compact milling head structure has thus been provided whereby an annular gang of closely associated milling tools may be efficiently operated. The independent end thrust bearings afforded the milling tools by the screws 36 provides for longitudinal adjustment of the shaft to procure disposition of the cutting end faces of the milling tools in a common vertical plane.

The worm drive shaft 39 for the milling gear annulus is journaled in bushings 46 secured at the sides of the casing 22 and has end thrust bearing 47 against one of said bushings in the direction of longitudinal stress. For driving this shaft as well as the work feeding mechanism, a shaft 48 is journaled in the outer wall of a casing 49 secured at one side of the table, carrying within said casing a gear 50 meshing with a pinion 51 on the adjacent projecting end of the shaft 39. The main drive shaft 48 also carries a pinion 52 meshing with a gear wheel 53 mounted on a feed drive shaft 54 extending transversely of the machine and journaled in bushings 55 mounted in the lower portions of the side casing walls of the table. Mounted on the shaft 48 outwardly of the casing 49 is a belt wheel 55 or any suitable drive element. This wheel and the gear 50 and pinion 52 are held on the shaft 48 by a rod 56 extending axially through the shaft and headed on its inner end to engage the pinion 52, a retaining nut 57 for the wheel 55 being threaded on the outer end of the shaft.

Figure 3:
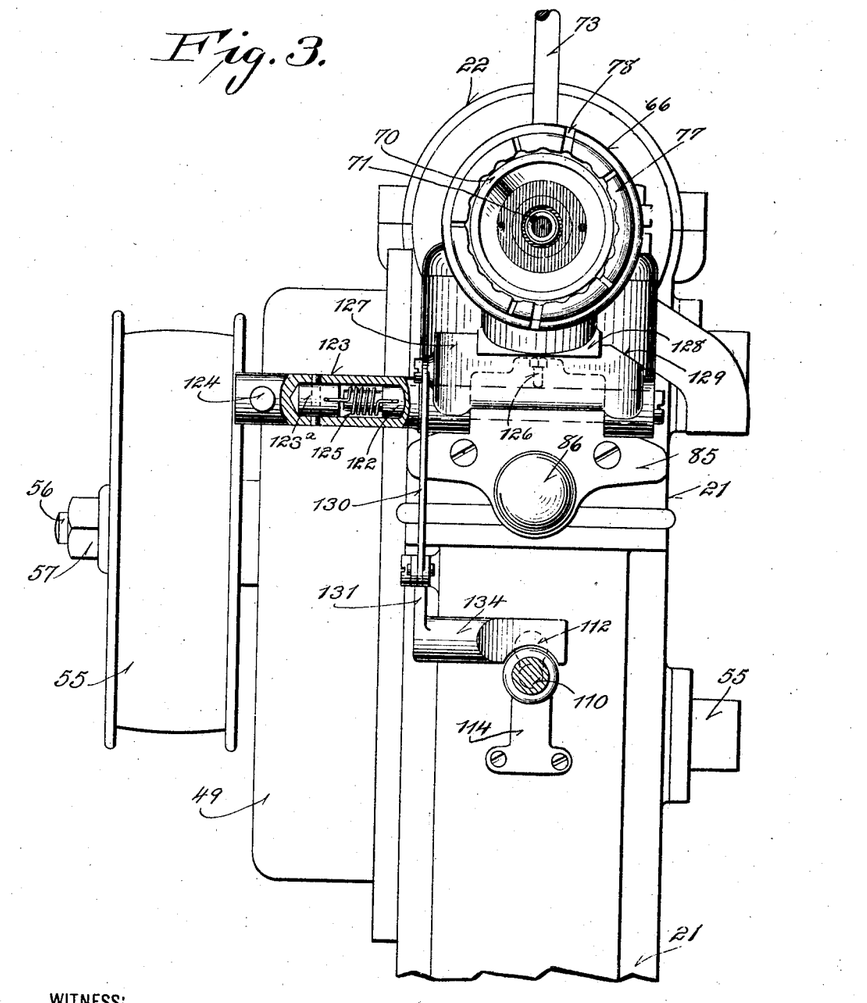
Fig. 3 is an elevational view of the operator's end of the machine.

For holding work material to be automatically fed toward and retracted from the milling head, a revolving turret is mounted for movement toward and away from the milling head and includes an elongated base block 58 slidable on the table 20. A pivot post 59 projects upwardly from the intermediate portion of this base block and revolubly mounted on this post is a collar 60 held thereon by a cap plate 61, said collar having radial turret arms 62 projecting therefrom, with their outer ends vertically directed and terminating in split chuck receiving collars 63 adapted for clamping restriction by bolts 64 passed through pairs of ears on their split edges. Thus, when the turret plate is retracted, the collar may be revolved to selectively present chucks carried in its collars 63 in working alinement with the milling head, and thus, while the milling operation is carried out in conjunction with work carried by one of the turret arms, the chuck of the other turret arm may be manipulated to receive a second work member.

Figure 7:
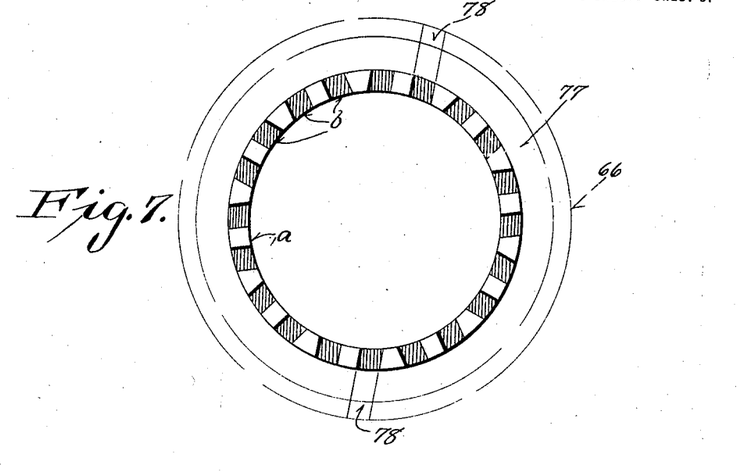
Fig. 7 is an end view of one of the retainer rings, comprising the work of the present machine, and showing the means for alining the cuts of the ring with the milling tools.
Figure 8:
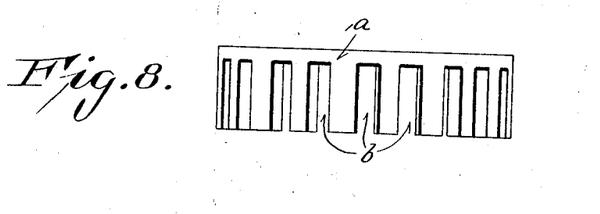
Fig. 8 is a side view of the ring.
Figure 9:
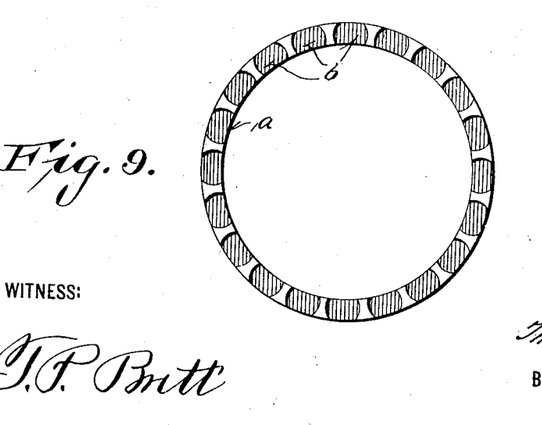
Fig. 9 is view similar to Fig. 8 showing the completed work.
Figure 10:
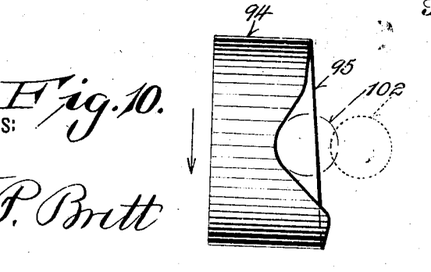
Fig. 10 is a detailed view of the turret shifting cam.
Figure 11:
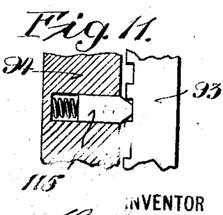
Fig. 11 is a detail sectional view of a yieldable holding cam of the turret shifting mechanism.

All of the above described structure, as well as certain mechanism hereinafter described and setting up the general operation of my machine, may be employed in connection with various cutting operations other than the specific operation herein contemplated as one example of the work of my machine. In describing the chuck members of the turret arms, however, I shall first describe the specific roller retainer ring on which the present machine is adapted to operate. This ring comprises a body annulus a as shown in Figs. 7 to 9 of the drawings, and in a manufacturing step prior to the milling operation of my machine, the body annulus is provided with a series of slots b extending parallel to its axis throughout the major portion of its width from one side, said slots being thus open at one side of the ring and being formed in diametrically opposite sets of pairs in the present instance, although it will be appreciated that any regular method of forming the slots may be employed, these slots being for the purpose of removing the bulk of material necessary to be cut away in the finishing operation of the rollers, whereby the milling operation effected by the present machine merely widens the slots and curves the sides thereof to properly receive the bearing rollers, the diameters of the milling tools being greater than the thickness of the work material as shown particularly by the completed work member illustrated in Fig. 9.

Figure 4:
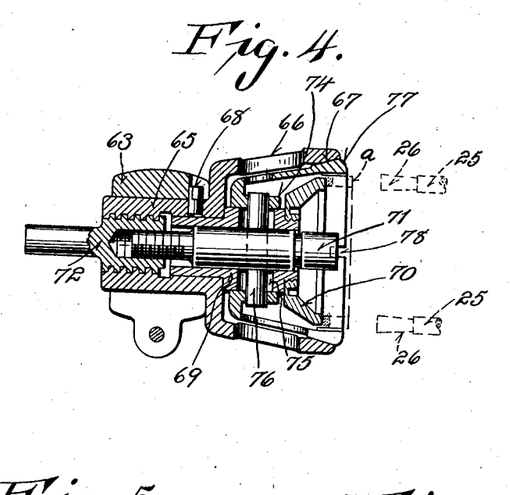
Fig. 4 is a horizontal sectional view through one of the chucks.

Each of the chucks for holding these retainer rings comprises a body sleeve 65 clamped in one of the turret arm collars 63 and having a cupped enlargement 66 at its end remote from the turret axis, said enlargement having a frusto-conical cam face 67 at its mouth portion. The body sleeve 65 is locked within the collar 63 by a lock pin 68. Engaged in the cupped end portion of the sleeve 65 is a sleeve 69 which extends into the cup enlargement and has threaded thereon a work seating annulus 70. Slidable in this sleeve 69 is a contracting shaft 71 which has its rear end threaded in the hollow enlarged end of a shaft 72 which in turn, has a coarser threaded engagement in the sleeve 65, the threads of these shafts extending in opposite directions. The shaft 72 carries an upstanding handle bar 73. Slidable on the sleeve 69 is a ring 74 and passed through this ring and through the shaft 71 and through a transverse axially elongated passage-way 75 in the sleeve 69 is a pin 76. The ring 74 carries a plurality of forwardly extending clamping jaws 77 which are resiliently urged outwardly against the cam face 67 of the body enlargement 66.

Thus, upon rotating the shaft 72, a compound threading movement will be procured in connection with the shaft 71 which will shift the ring 74 either inwardly or outwardly and consequently expand or contract the jaws 77 by reason of their engagement with the cam face 67, and thus one of the retainer rings to be operated upon may be readily secured in the chuck, in seating relation against the annulus 70. To dispose the previously cut slots b of the retainer ring in proper registry with the milling tools opposed portions of the chuck casing or cup 66 and adjacent jaw portions are provided with alined slots 78 into which a suitable bar or other tool may be inserted to aline corresponding slots of the retainer ring with said recesses, it being noted that the line connecting the recesses is disposed at one side of the axis of the chuck in the present instance in accordance with the corresponding disposition of the opposed pairs of ring slots. It is further noted that the inner faces of the jaws are cut away at regularly spaced portions to provide clearance for the milling tools in projecting outwardly of the peripheries of the work rings.

Figure 5:
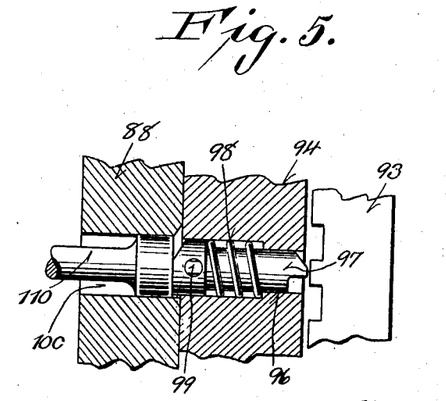
Fig. 5 is a detailed sectional view showing the operation of the driving pawl for the milling mechanism.

For automatically feeding and retracting the turret with respect to the milling head, such feeding and retraction constituting one cycle of the operation of the machine, a shift bar 79 is mounted longitudinally under the table, having slidable bearings in passages 80 in the end casing walls of the table. The intermediate portions of the shaft bar and turret base are adjustably connected inwardly of an adjacent collar 60 by a bolt 81 passed through a longitudinally elongated slot 82 in the turret base and through a spacer block 83 disposed in a slot of the table and finally threaded in the shift bar, the base block, spacer block 83 and shift bar being thus securely clamped together in a manner permitting free sliding movement relative to the table. Adjustment of the relative positions of the shift bar and turret base is afforded by a screw 84 threaded in the outer end portion of the shift bar and passed through a plate 85 secured to and depending from the outer end of the turret base block, this screw being terminated in a knurled head 86 having suitable graduations thereon, whereby a most exact degree of adjustment may be procured. It may be at this point stated that the shift bar 79 has a constant degree of reciprocating movement, and thus adjustment of the turret base with respect to the shift bar will procure an adjustment of the inner limit of movement of the turret with respect to the milling head. A shaft 87 is carried by a pair of spaced sills 88 transversely connecting the table casing walls below the milling head and mounted on this shaft is a sleeve 89 on which is journaled a worm wheel 90 meshing with a worm 91 mounted on the feed drive shaft 54 heretofore described. The hub of this worm wheel is extended inwardly and has secured thereon by the radial lock pins 92 a clutch ring 93 having regularly spaced right-angular clutch recesses at its outer wall portion. Also rotatably mounted on the sleeve 89 between the clutch ring 93 and the inner sill 88 is a cam disk 94 having a cam flange 95 projecting from its side portion adjacent the clutch ring 93 and partially embracing the same. Slidably mounted in a pasage-way 96 extending transversely through the cam disk is a pawl 97 having a tooth on its end adjacent the clutch recesses selectively engageable therein and being resiliently urged in the opposite direction by a spring 98 coiled thereon within the passage-way. The pawl is held against rotation in the passage-way by a key 99 engageable in the kerf thereof. The inner sill 88 is provided with a transverse passage 100 adapted to register with the passage-way 96, the end wall of said passage-way 100 there-adjacent being widened at one side and thus, as shown in Fig. 5, as the passage-ways move into registry, the pawl 97 is urged by its spring 98 out of engagement with the clutch recesses of the ring 93 and into the passage-way 100 to abut against the wall of said passage-way and thus stop rotation of the cam disk, the clutch ring being continuously driven. The shift bar 79 extends transversely above the cam disk 94, having a depending portion at the cam side of the disk, and mounted in this depending portion and held by a retaining plate 101 is a roller 102 engageable with the cam flange of the disk. For yieldably urging the shift bar to retracting position and thus holding the roller 102 against the cam, a plunger head 103 is slidably mounted in a guide loop 104 depending from the intermediate portion of the shift bar, and extending from this plunger head is a shank 105 having its free end slidable in a bearing 106 depending from the outer end portion of the shift bar. A roller 107 is mounted in the plunger head and is yieldably urged against the flat side of the cam disk remote from its flange by a main retracting spring 108 coiled on the shank 105 between the bearing 106 and a stop nut 109 threaded on the shank adjacent the guide loop 104.

Thus, upon each complete rotation of the cam disk, a reciprocation of the shift bar and consequently of the turret will be effected and operation of the machine will be stopped at the proper time, when the milling action has been completed so that the stopping of the machine affords an indication of the completing of the milling action whereupon the operator makes the necessary manual manipulations to procure the succeeding milling operation. For manually instituting rotation of the cam disk a plunger shaft 110 is provided having its head end slidable in the passage-way 100 of the sill 88 and extending forwardly therefrom and provided with a reduced intermediate end portion 111 slidable in the depending shank of a keyhole slot 112 formed in the forward table casing wall, the consequent shoulders formed by the reduction of this intermediate portion of the shaft forming stops engageable with the wall to permit limited reciprocating movement of the shaft. The forward end of the shaft terminates in a handle 113 and it is resiliently urged to its limit of forward movement by a leaf-spring 114 secured to the wall and engaging the forward shoulder of its reduced portion. Upon pushing the shaft inwardly against the action of this spring 114, its plunger end will engage the pawl 97, forcing it from the passage-way 100 and engaging its tooth end in a recess of the clutch ring 93, thus instituting rotation of the cam disk, and as this rotation proceeds, the pawl is held in engagement with the cam disk by the enlarged inner face of the sill 88 until the pawl comes again in registry with the passage 100.

A detent and balance pawl 115 is slidably mounted in the cam disk at a point approximately diametrically opposite the drive pawl 97, being yieldably urged into engagement with the recesses of the cam ring 93 and riding into and out of said recesses when the cam disk is stationary.

So as to procure minimum friction and operating stress in the machine, it is desirable that the expansile spring 108 be only sufficiently strong to retract the slide bar and turret. At the completion of the milling operation however, there is a tendency for the milling tools to stick in the slots b of the work and prevent operation of the spring, and to overcome this tendency without imparting undesired retractile stress throughout the operation of the machine. I mount a plunger bar 116 in the recessed inner end of the turret base 58, this bar having an intermediate headed portion held in the recess by a plug 117 through which the bar slidably projects, the bar being urged outwardly by an expansile spring 118 coiled thereon within the recess. This plunger bar is engageable with an abutment bar 119 adjustably mounted in the lower portion of the head casing 22. Thus, as the turret moves to its limit of inward movement, the bar 116 engages the bar 119 to compress the spring 118, whereby the force of the spring is exerted in assisting the spring 108 to retract the turret, this additional force being thus exerted during but a very small portion of the operative movement of the turret.

The inner end of the base bar 58 of the turret also carries a slide head 120 engaging the bottom surface of the lower pan-shaped portion of an oil casing 121 surrounding the drills, whereby to counteract lifting tendency of the inner end of the turret base by reason of pressure of the milling tools above the base with application of feeding power below the base.

I have provided means for holding the turret chucks in proper alinement with the milling tools during the feeding operation of the turret, and the actuation of such holding means toward and away from operative position also serves to actuate safety mechanism controlling the institution of the feeding operation, whereby it is impossible to institute the feeding operation until a chuck disposed adjacent the milling tools has been properly held and set in opposition thereto. To accomplish this, a shaft 122 is journaled transversely in the outer or forward end of the turret base block 58, and mounted on one end of this shaft is a sleeve 123 projecting outwardly from the shaft, carrying a handle 124 at its end and having a plug 123ª fixed in its outer portion, and affording secureinent for one end of a spring 125 coiled on the reduced extremity of the shaft 122 and having its other end secured to said shaft, whereby the sleeve is normally urged to rotation in one direction, the shaft being held against rotation in the base block 58 by a set screw 126 inserted in the block and engaging thereagainst. The sleeve is formed on one of the arms of a locking block 127 whose other arm is mounted on the end of the shaft 122 remote from the sleeve, said arms extending obliquely upward and outward from the shaft, and the block being provided in its upper portion with a squared recess adapted to snugly selectively receive squared enlargements 128 formed on the outer end portions of the turret arms 62, one side of the block 127 being beveled as at 129, whereby these square enlargements may ride into locking engagement with the recesses by rocking the block downwardly against the action of the spring 125.

Pivoted to and depending from one side of the block is a link 130 having its lower end pivoted to one end of an angular link 131 whose other end is pivoted to the forward end of a link 132, the other end of the link 132 being in turn pivoted to one of the side casing walls of the table at 133. Extending inwardly from the link 131 at its juncture with the link 132 is a locking arm 134 having its free end portion flattened and arcuately recessed to engage the outer shoulder of the reduced portion 111 of the plunger shaft 110 which institutes operation of the turret feeding mechanism.

Thus, when either of the chucks is adjacent the milling head, the holding block 129 will be depressed, and the locking arm 134 will be engaged behind the shoulder of the shaft 110 to prevent operative movement of said shaft, this locking arrangement being released by lifting movement of the block upon engagement in its holding recess of the turret arm enlargement 129 of the chuck remote from the milling head, thus freeing the shaft 110 for manual operation to institute the feeding movement of the turret.

A machine has thus been provided which is capable of very efficient and rapid operation, without requiring the exercise of any particular skill on the part of the operator, the only manual action necessary being the placing of the work articles in the chucks and the institution of the feeding and retracting operation by pressing the handle 113 of the shaft 110 at the permitted periods. While a work article is being milled in the rearward or inner chuck, the operator is engaged in removing the previously milled work article and inserting a fresh article in the other chuck. Thus, when one milling operation has been completed, and the turret moved to retracted position, the operator depresses the handle 124 controlling the holding block, permitting swinging movement of the turret arms to dispose the newly filled chuck in cutting alinement with the milling tools.

While I have shown and described a preferred embodiment of my invention it will be understood that various changes and modifications of structure and arrangement, within the scope of the appended claims, may be employed to meet different conditions of work without departing in any manner from the spirit of my invention.

What is claimed is:

1. A cutting machine including a tool head, a turret mounted for movement toward and away from the tool head, means for automatically feeding the turret toward the tool head, a plurality of work holding members carried by the turret and selectively movable to cutting alinement with the tool head, means for locking the work holding members in such position, and means for preventing actuation of said automatic means prior to movement of said work holding members to such position.

2. A cutting machine including a tool head, a turret mounted for movement toward and away from the tool head, means for automatically feeding the turret toward the tool head, a plurality of work holding members carried by the turret and selectively movable to cutting alinement with the tool head, a manually movable member for instituting operation of said automatic feeding means, means for selectively locking the work holding members in cutting alinement with the tool head and means operable by said locking means for preventing movement of the said manually movable member prior to movement of said work holding members to cutting alinement.

3. A cutting machine including a tool head, a turret mounted for movement toward and away from the tool head, means for automatically feeding the turret toward the tool head, a plurality of work holding members carried by the turret and selectively movable to cutting alinement with the tool head, a manually movable member for instituting operation of said automatic feeding means, a holding member movable for co-action with the work holding members to hold them in cutting alinement with the tool head, and means operable by movement of said holding member for preventing movement of said manual member.

4. A cutting machine including a tool head, a turret mounted for movement toward and away from the tool head, means for automatically feeding the turret toward the tool head, a plurality of work holding members carried by the turret and selectively movable to cutting alinement with the tool head, a manually movable member for instituting operation of said automatic feeding means, a holding member movable for co-action with the work holding members to hold them in cutting alinement with the tool head, a shoulder on said manually movable member, a lock arm movable for engagement with said shoulder to prevent movement of said manually movable member and a link connection between the holding member and said lock arm.

5. A cutting machine including a tool head, a turret base movable toward and away from the tool head, means for automatically procuring movement of the turret base, arms rotatably mounted on the turret base, work holding members carried by said arms and movable upon rotation of the arms to cutting alinement with the tool head, a holding member carried by said base and engageable with the arms to hold them against rotative movement on the base, means for manually instituting automatic movement of the turret base and means operable by movement of said holding member for preventing operation of said manual means.

6. A cutting machine including a tool head, a turret base movable toward and away from the tool head, means for automatically procuring movement of the turret base, arms rotatably mounted on the turret base, work holding members carried by said arms and movable upon rotation of the arms to cutting alinement with the tool head, a member carried by said base and engageable with the arms to hold them against rotative movement on the base and means operable by movement of said holding member for preventing movement of the turret base.

7. A cutting machine including a main support, a tool head mounted on said support, a turret movable on said support toward and away from the tool head, means carried by said support for procuring automatic movement of the turret, a plurality of work holding members carried by the turret and selectively movable to cutting alinement with the tool head, a manually movable member carried by the main support for instituting operation of the automatic feeding means, a member carried by the turret and movable for co-action with the work holding members to selectively hold them in cutting alinement with the tool head, a series of mutually connected links pivoted to the said member and to the main support, and an arm carried by one of said links and engageable with the manually movable member, to prevent movement thereof in certain positions of said holding member.

8. A cutting machine including a tool head, a turret movable toward and away from the tool head, a turret base, a collar revolubly mounted on the turret base, arms projecting from said collar, work holding members carried by said arms, and a holding member pivotally mounted on the turret base and resiliently urged to intersect the path of movement of the arms, and provided with a recess adapted to selectively receive the lower portions of the arms.

9. A milling machine including a milling head, an annular gang of milling tools carried thereby, a turret movable toward and away from said milling tools and a ring-holding chuck mounted on said turret and including jaws having their gripping surfaces cut away to provide clearance for the outer portions of the milling tools.

10. In a milling machine of the class described, a milling head casing, spaced bearing rings in the casing, journal rings nested in the bearing rings, an annular series of milling shafts extending between the rings and journaled in said rings, a core cylinder extending through the journal rings, an oil passage extending through the core cylinder, means for securing said core cylinder, rings and casing together, a drive annulus journaled on the bearing rings and provided with internal and external teeth, pinions on the milling shafts between the rings meshing with the internal teeth and a drive means meshing with the external teeth.

11. In a milling machine of the class described, a milling head casing, spaced bearing rings in the casing, journaled rings nested in the bearing rings, an annular series of milling shafts extending between the rings and journaled in said rings, a core cylinder extending through the journal rings, an oil passage extending through the core cylinder, a shoulder on the forward end of the core cylinder for preventing relative movement of the core cylinder rearwardly in the rings, an end plate on the rear end of the core cylinder engageable with the adjacent ring, a binding nut threaded on the core cylinder engaging said end plate, a drive annulus journaled on the bearing rings and provided with internal and external teeth, pinions on the milling shafts between the rings meshing with the internal teeth and a drive means meshing with the external teeth.

12. A cutting machine including a tool head, a turret movable toward and away from the tool head in one cycle of movement, means for automatically procuring one cycle of movement of the turret and for stopping the turret at the end of said cycle and manual means for instituting said cycle of movement.

13. A cutting machine including a tool head, a work carrying turret movable toward and away from the tool head, a shifting member connected with the turret, a cam engageable with said member for imparting one reciprocation thereto upon one rotation of the cam, means for instituting rotation of the cam, and means for automatically stopping rotation of the cam upon completion of one revolution.

14. A cutting machine including a tool head, a work carrying turret movable toward and away from the tool head, a shifting member connected with the turret, a cam engageable with said member for imparting one reciprocation thereto upon one rotation of the cam, means for instituting rotation of the cam, means for automatically stopping rotation of the cam upon completion of one revolution and a spring urging said member against the cam.

15. A cutting machine including a tool head, a turret movable toward and away from the tool head in one cycle of movement, a shifting member connected with the turret, a continuously driven member, a cam disk mounted adjacent said continuously driven member and having its cam portion engageable with the shifting member to shift the same, means for connecting the cam disk with the continuously driven member, and means for releasing such connection upon completion of one cycle of movement of the turret.

16. A cutting machine including a tool head, a turret movable toward and away from the tool head, a shifting member connected with the turret, a continuously driven member, a cam disk mounted adjacent said continuously driven member and having its cam portion engageable with the shifting member to shift the same, a stationary member mounted adjacent the disk and provided with a passage, a pawl slidably mounted in the disk and engageable with the continuously driven member to procure rotation of the disk and said pawl being movable into the passage of the stationary member to procure disengagement thereof from the continuously driven member and to stop rotation of the cam disk, and means for moving said pawl from the passage to institute driven rotation of the cam disk.

17. A cutting machine including a tool head, a turret movable toward and away from the tool head, a shifting member connected with the turret, a continuously driven member, a cam disk mounted adjacent said continuously driven member and having its cam portion engageable with the shifting member to shift the same, a stationary member mounted adjacent the disk and provided with a passage, a pawl slidably mounted in the disk and engageable with the continuously driven member to procure rotation of the disk and said pawl being movable into the passage of the stationary member to procure disengagement thereof from the continuously driven member and to stop rotation of the cam disk, and a longitudinally slidable shaft having one end engaged in the passage and having the other end manually engageable to move the pawl from the passage.

18. A cutting machine including a tool head, a turret movable toward and away from the tool head, a shifting member connected with said turret, a cam disk having a cam portion at one side thereof, means for procuring intermittent rotative movements of the disk, a portion of said shifting member being engageable with the cam side of the disk and means carried by the shifting member and urged against the other side of the disk for holding said portion of the shifting member in engagement with the cam portion of the disk.

19. A cutting machine including a tool head, a turret movable toward and away from the tool head, a shifting member connected with said turret, a cam disk having a cam portion at one side thereof, means for procuring intermittent rotative movements of the disk, a portion of said shifting member being engageable with the cam side of the disk, a plunger slidably carried by the shifting member and a spring carried by the shifting member and resiliently urging said plunger to engagement with the other side of the cam disk.

20. A cutting machine including a table, a tool head mounted on the table, a turret base slidably mounted on the table for movement toward and away from the tool head, a work holding member carried by said turret base, a shifting bar slidably mounted under the table, said table being provided with an intermediate slot, means connecting the turret base and shifting bar and slidable in said slot, adjustable means connecting the outer ends of the turret base and shifting bar and means engaging the inner end of the shifting bar for automatically procuring reciprocation thereof.

21. A cutting machine including a tool head, a work carrying turret movable toward and away from the tool head, a shifting member connected with the turret, means engaging said shifting member for feeding the turret toward the tool head, means yieldably urging the shifting member in an opposite direction, a spring urged plunger carried by the turret and an abutment for said plunger adjacent the drill head to procure compression of the spring at and adjacent the limit of movement of the turret toward the drill head.

22. A cutting machine including a tool head, a work carrying member movable toward and away from the tool head, means yieldably urging said work carrying member away from the tool head, means for automatically feeding the work carrying member toward the tool head and yieldable means opposing movement of work carrying member at and adjacent its limits of movement toward the tool head for coöperation with the first-named yieldable means to urge the members from the head.

23. A machine for milling out previously cut openings in an annular work member, including a gang of milling tools and a chuck adapted to receive the work member and movable toward and away from the milling tools, said chuck being provided with an opening adapted for reception of a tool to engage also in one of the openings of the work member to aline the openings of said member with the milling tools.

24. A cutting machine including a tool head, a turret rotatably and slidably mounted for movement toward and away from the tool head, upstanding arms on said turret, a chuck casing carried by each of said arms, gripping jaws in the outer portion of each casing, shafts threaded in the casings and connected with the jaws for moving said jaws upon longitudinal threading movement of the shafts and handles on said shafts.

25. In a machine for cutting slots in the wall of an annular work member, an annular gang of milling tools, a chuck casing mounted for movement toward and away from the milling tools and having a cup-shaped enlargement there-adjacent, a sleeve mounted in the casing and projected into the enlargement thereof, a collar on said sleeve, resilient jaws carried by said collar and in cam engagement with the mouth portion of the enlargement, a seating annulus threaded on the sleeve outwardly of the collar, a shaft slidable in the sleeve, a connection between the shaft and collar, and means for advancing and retracting the shaft in the sleeve.

26. In a machine for cutting slots in the wall of an annular work member, an annular gang of milling tools, a chuck casing mounted for movement toward and away from the milling tools and having a cup-shaped enlargement there-adjacent, a sleeve mounted in the casing and projected into the enlargement thereof, a collar on said sleeve, resilient jaws carried by said collar and in cam engagement with the mouth portion of the enlargement, a seating annulus threaded on the sleeve outwardly of the collar, a shaft slidable in the sleeve, a connection between the shaft and collar, and means for advancing and retracting the shaft in the sleeve including a second shaft threaded in the chuck casing and having a recess threadedly receiving the first-named shaft, the sets of threads being opposite in nature, and a handle on the second-named shaft.

In testimony that I claim the foregoing I have hereunto set my hand at Milwaukee, in the county of Milwaukee and State of Wisconsin.

THEODOR ZETTERLUND.